United States Patent [19]
Goker

[11] Patent Number: 6,130,792
[45] Date of Patent: Oct. 10, 2000

[54] FLAT SERVO BURSTS FOR ARCUATE TRACK SCANNER

[75] Inventor: Turguy Goker, Solana Beach, Calif.

[73] Assignee: Seagate Technology, Inc., Scotts Valley, Calif.

[21] Appl. No.: 08/891,094

[22] Filed: Jul. 9, 1997

Related U.S. Application Data

[63] Continuation-in-part of application No. 08/555,681, Nov. 13, 1995, Pat. No. 5,847,892.

[51] Int. Cl.[7] ........................................... G11B 5/09
[52] U.S. Cl. .......................... 360/48; 360/64; 360/73.04; 360/76
[58] Field of Search ........................... 360/76, 75, 73.01, 360/64, 48, 73.04, 73.07, 77.12

[56] References Cited

U.S. PATENT DOCUMENTS

| | | |
|---|---|---|
| 2,750,449 | 6/1956 | Thompson et al. |
| 2,772,328 | 11/1956 | Lyon . |
| 2,900,444 | 8/1959 | Camras . |
| 2,924,668 | 2/1960 | Hoshino et al. |
| 3,320,371 | 5/1967 | Bach . |
| 3,351,718 | 11/1967 | Banning, Jr. et al. |
| 3,790,755 | 2/1974 | Silverman ................................. 348/96 |
| 4,112,472 | 9/1978 | Hauke et al. ............................ 360/102 |
| 4,139,871 | 2/1979 | Yoshida et al. ........................... 360/64 |
| 4,525,754 | 6/1985 | Handley .................................. 360/51 |
| 4,636,886 | 1/1987 | Schwarz .................................. 360/84 |
| 4,647,993 | 3/1987 | Schwarz et al. .......................... 360/84 |
| 4,731,681 | 3/1988 | Ogata ...................................... 360/85 |
| 5,060,104 | 10/1991 | Kitaori et al. ....................... 360/130.24 |
| 5,339,207 | 8/1994 | Moon et al. .......................... 360/77.05 |
| 5,345,345 | 9/1994 | Yamashita et al. ....................... 360/64 |
| 5,371,638 | 12/1994 | Saliba .................................. 360/77.12 |
| 5,381,277 | 1/1995 | Jaffard et al. ............................. 360/62 |
| 5,396,376 | 3/1995 | Chambors et al. ........................ 360/48 |
| 5,412,517 | 5/1995 | Fujimori .................................. 360/64 |
| 5,446,601 | 8/1995 | Fukuta .................................... 360/46 |
| 5,448,430 | 9/1995 | Bailey et al. ......................... 360/77.12 |
| 5,453,887 | 9/1995 | Negishi et al. ........................ 360/77.1 |
| 5,488,525 | 1/1996 | Adams .................................. 360/104 |

FOREIGN PATENT DOCUMENTS

| | | |
|---|---|---|
| 63913 | 9/1984 | Japan . |
| 169716 | 12/1987 | Japan . |
| WO 93/26005 | 12/1993 | WIPO . |
| WO 5/06940 | 3/1995 | WIPO . |
| WO 6/00437 | 1/1996 | WIPO . |

OTHER PUBLICATIONS

Lissner, R.W., "Movable Head/Movable Track Accessory Arrangement", IBM Tech Disclosure Bulletin, Mar. 1977.

*Primary Examiner*—Andrew L. Sniezek
*Attorney, Agent, or Firm*—McDermott, Will & Emery

[57] ABSTRACT

To control operations of an arcuate scanning head assembly, servo signals are written in one or more designated servo regions along a recording tape, for example along one or both edges of the recording area on the tape. To minimize the space occupied by the servo signals, the servo signals are always written with an azimuth that is substantially parallel to the longitudinal axis of the tape. In the preferred embodiment, servo signals aligned with adjacent tracks are written at two different positions within a servo region. As a read head passes over a track and the servo region, the head should overlap the servo signal aligned with that track and a portion of the servo signal aligned with the adjacent track. A control system samples the signal from the read head in a first time window corresponding to passage of the head across a burst aligned with the track and in a second time window corresponding to passage of the head across a burst aligned with the adjacent track. The system controls one or more parameters relating to the scanning operation as a function of a relationship of the two sampled amplitudes.

21 Claims, 11 Drawing Sheets

FLAT SERVO BURSTS FOR ARCUATE TRACK SCANNER

CROSS-REFERENCE TO RELATED APPLICATION

This application is a continuation-in-part of U.S. patent application Ser. No. 08/555,681 filed on Nov. 13, 1995 entitled SERVOING AND FORMATTING MAGNETIC RECORDING TAPE IN AN ARCUATE SCANNER SYSTEM which has issued as U.S. Pat. No. 5,847,892.

FIELD OF THE INVENTION

The present invention relates to tape drives having an arcuate scanner, and more particularly to information formats and servo control techniques of the scanner heads based on signals within the information format, to accurately control the arcuate scanner during reading and writing operations.

DESCRIPTION OF RELATED ART

A number of magnetic tape drive systems have been developed to provide mass data storage, for example for personal computer systems. One emerging technology providing high density storage, preferably on quarter inch magnetic tape, utilizes arcuate scanning. With this type of scanning, read and write scanner heads are mounted near the periphery of a circular planar surface and rotated thereon about an axis passing through the center of the circular surface and through the plane of a longitudinally-moving tape. In writing data on a tape, arcuate scanners produce a sequence of arcuately-shaped tracks which are transverse to the longitudinal axis of the tape.

Examples of arcuate scanning tape drives are described, for example, in: U.S. Pat. No. 2,750,449; U.S. Pat. No. 2,924,668; U.S. Pat. No. 3,320,371; U.S. Pat. No. 4,636,886; U.S. Pat. No. 4,647,993; and U.S. Pat. No. 4,731,681.

International Application WO 93/26005 to Lemke et al. discloses an example of an arcuate scanning tape drive for computer data storage, and the disclosure thereof is expressly incorporated herein entirely by reference. In the Lemke et al. arcuate scanning tape drive, a number of scanner heads are provided around the periphery of the circular planar surface. As the scanner rotates and the tape moves past the rotating scanner surface, the read and write heads alternately pass over the tape. The operation of the scanner is commutated or switched from "write" to "read" to alternately activate the appropriate operation through alternate ones of the scanner heads.

To effectively read and write data in arcuate tracks on a longitudinally moving tape requires (1) writing the tracks in an agreed format, position and alignment on the tape, and (2) corresponding positioning and alignment of the read heads during the read operation to locate and recover the data written on the tracks. In an arcuate scanner of the type described by Lemke et al., there are a number of variables which effect both the read operation and the write operation. These include tape speed, rotational speed of the scanner head and orientation of the scanner head with respect to the tape. Several of these variables are effected by external factors. For example, if there is some vibration of a scanner during the writing operation, it may be difficult to align the head with the data tracks during a subsequent read operation, particularly if the read operation is performed by a different scanner.

The above cited Lemke et al. document discloses the most effective technique proposed in the past for controlling the relevant variables during reading and writing operations by an arcuate scanner. In the Lemke et al. system the servo functions employ low frequency servo information detected at the beginning and end of each scan. The low frequency servo information indicates the alignment of the scanning path traced by transducers with respect to adjacent tracks.

FIG. 9 illustrates one arcuate information format used by Lemke et al. and the relationship of servo bursts within that recorded format to one of the servo scanning heads $R_0$. As illustrated, servo burst segments are recorded in servo burst regions adjacent to the tape upper edge and the tape lower edge by alternating write transducers. These are denoted, respectively, as the first and second servo regions. The servo bursts are written by write transducers that Lemke et al. identify as 'even' transducers $W_0$ and $W_2$ but not by 'odd' write transducers identified as $W_1$ and $W_3$. The servo bursts are written by turning on the even write transducers earlier than the odd write transducers after passing the upper tape edge and by turning off the odd write transducers earlier than the even transducers as the lower tape edge is approached. The servo bursts comprise alternate frequencies which are at equal amplitudes in an unequalized channel and are generated from a system clock.

The even and odd write heads record data at different azimuth angles with respect to the longitudinal axis of the recording tape and the read heads read data at corresponding azimuthal angles. Lemke et al. identify the azimuth of the even heads as a 'CW' azimuth and identify the azimuth of the odd heads as a 'CCW' azimuth. $W_0$, (CW azimuth) engages the tape upper edge and writes track 0 consisting of a servo band of $f_0$. After delay for passage through the first servo region, this write head writes track 0 containing data $D_0$. Next write head $W_0$ writes a servo burst consisting of a band of $f_0$ in the second servo region.

Write head $W_1$ has a CCW azimuth. This head engages the upper edge of the tape. At this time, the tape has advanced a distance corresponding to one data track width or pitch. Writing with this transducer is delayed until $W_1$ has passed the first servo region, then $W_1$, which overlaps track 0, overwrites track 0 with track 1 consisting of data $D_1$ with no gap between track 0 and track 1. This leaves a trimmed data track 0 with a width equal to one data track width. Track 1 ends at the upper edge of the second servo region. At this point, data tracks 0 and 1 are bracketed between upper and lower servo bursts comprising of servo frequency $f_0$.

At the time that head $W_2$ begins crossing the tape, the tape has moved a total distance corresponding to two times the data track width. $W_2$ with a CW azimuth begins tracing its arc from the upper edge of the tape to write track 2 consisting, initially, of a band of $f_2$ in the first servo region. Write head $W_2$ then writes track 2 including data $D_2$. The outer edge of $W_2$ overlaps track 1 so as to overwrite it, beginning in the data field, with track 2 data, ensuring no gap between track 1 and track 2. This leaves a trimmed data track 1 of one pitch width. $W_2$ appends a servo burst consisting of $f_2$ in the second serve region.

When the tape has moved another track pitch, the write head $W_3$ with a CCW azimuth engages the upper edge of the tape and writes only a data track, in the manner described above with regard to the write operation by head $W_1$. When $W_0$ with CW azimuth again engages the upper edge of the tape, the cycle described above is repeated.

A tape speed servo loop operates during playback to ensure head/track alignment. This is a sampled servo which receives servo information when the even-numbered read transducers, $R_0$ and $R_2$, read the servo bursts in the leading segments of recorded tracks. In the first servo region of the tape, there are only even tracks (0 and 2) of frequency $f_0$ and $f_2$, written by write transducers $W_0$ and $W_2$, respectively. Servo frequency $f_0$ is written by write transducer $W_0$, while servo frequency $f_2$ is written by write transducer $W_2$. Now, assume that read transducer $R_0$ has just passed the upper tape edge on its counterclockwise scan of track 0 as shown in FIG. 26A. If transducer $R_0$ is accurately positioned, substantially ¾ of its width will be on the servo track written by transducer $W_0$, while ¼ of its width will be on the servo burst in a track written by transducer $W_2$. Accordingly, with proper positioning, the read transducer $R_2$ while traversing the servo bursts at the beginning and end of each scan will generate a servo signal comprising the servo frequencies $f_0$ and $f_2$ in the ratio $3f_0:1f_2$. These two frequencies are discriminated and their amplitude ratio is used to determine the magnitude of a servo error signal. Any other ratio is discriminated and controls the servo to change the tape speed so that the above ratio is obtained. The identical process occurs when read transducer $R_2$ is reading its tracks, in which case the ratio of the servo burst in the first servo region is $3f_2:1f_0$.

In actual practice, the azimuth of the servo/data tracks will be substantially parallel to the longitudinal tape axis in one servo region and at an angle to the longitudinal tape axis in the other servo region. In some systems, for example, the azimuth of the servo burst recording by one pair of heads is substantially parallel to the longitudinal tape axis in the bottom servo region, but the azimuth of the servo burst recording is at a substantial angle to the longitudinal tape axis in the top servo region. This example of azimuth alignments is illustrated by the parallel lines in the $f_2$ servo regions in track 2, in FIG. 9.

The servo regions occupy a substantial portion of the recording area of the tape. It is desirable to minimize the size of these regions to permit maximization of the area on which data can be recorded. Although the intent is to keep the two servo regions at approximately the same size and as small as possible, the servo region wherein the recording exhibits the azimuth angle with respect to the longitudinal axis typically occupies a larger region of the tape. It therefore would be desirable to reduce the size of one or both of the servo regions, to increase the data recording capacity of the tape.

The Lemke et al. system exhibits a number of other deficiencies. As shown by the above discussion, the servo bursts of any two adjacent tracks have different frequencies. A position error signal is developed by filtering the readback signal obtained from the transducer reading the servo burst and determining ratios of the magnitudes of the separated signals. This two-frequency servo control of Lemke et al. theoretically provides a highly accurate servo control of the arcuate scanner. In practice, however, there are certain problems with that type of servo control. The detection of the servo burst signals requires two different frequency filters, one for each servo frequency, adding to the complexity and expense of the scanner electronics.

Also, one servo head simultaneously detects recorded signals at both burst frequencies. As a result, the output signal from the servo head is a combination of signals of different frequencies. The combination of the signals produces complex intermodulation products or beat signals which must be filtered out. Inadequate filtering causes distortions of the relative amplitudes of the detected servo bursts. Any distortion of the relative amplitudes may introduce inaccuracies in the position control error signal and the tracking in response to that signal.

As shown by the above discussion, the analog processing circuitry required to detect the two servo bursts is overly complex, and the use of two separate servo burst frequencies simultaneously detected through one servo head may cause problems in accurately detecting the amplitude relationship and thus inaccuracies in positioning of the scanner head assembly relative to the tracks containing the two servo bursts.

Applicant's Earlier Work

The disclosure of commonly assigned copending application Ser. No. 08/555,681 filed Nov. 13, 1995 is hereby incorporated herein entirely by reference. In that copending case, applicant proposed a solution to several of the servoing problems outlined above. However, the proposed solutions did not address the problem of the size of the servo regions.

Attached FIG. 10 shows the exemplary format of the information on the developed tape disclosed in the related application, in somewhat simplified form. It should also be noted that the various regions on the tape are not drawn to scale.

As shown in FIG. 10, the 'TRIBO' interface standard specifies a region along the top edge T of the tape as a guard band. A similar guard band extends along the lower edge L of the tape. Each TRIBO guard band extends for the full length of the tape. The arcuate scanner type data recording system will not write data in the guard bands.

Along the inner edge of each guard band is a magnetic stripe, designated an LS1 stripe. The tape cartridge manufacturer deeply records the LS1 stripes along the entire length of the tape. The recorded sections of the tape are spaced from the upper and lower guard bands and LS1 stripes by a specified distance.

The actual data tracks are bounded by a top servo region and a lower servo region. In the developed tape product with information recorded thereon, the servo regions or tracks are approximately twice as wide as the data tracks when measured in the direction of the longitudinal tape axis. Within these regions bursts A and B of servo frequency signals are recorded at predetermined locations. During the writing operation, the scanner writes predetermined amounts of erase signals before and after the respective servo bursts. During a subsequent read operation, a predetermined read head partially overlaps data tracks in such a manner that it detects differing predetermined amounts of the A and B servo bursts during different time windows. The scanner system uses comparisons of the detected amplitudes of the various A and B servo bursts as a servo control, e.g. for servo control of tape speed and/or the tilt angle of the arcuate scanner head assembly (ASHA).

More specifically, during reading operations, a read head centered over one data track will pass both the servo regions around that data track and a portion of each of the servo regions around an adjacent track. A circuit samples the amplitude of the servo signal, taken during different time windows corresponding to passage over the various servo bursts in the two tracks. One or more relationships between the amplitudes of predetermined pairs of samples are used to produce one or more position error signals. Control elements, such as the tape drive motor and the tilt motor, adjust the operation of the scanner system in response to the position error signals.

The servoing system disclosed in the prior application eliminates a number of the above noted problems encountered in the prior art Lemke et al. servo control system. For example, there is no need to use two different frequency servo signals and therefore no need for two different frequency filters for processing such signals. Also, because only one servo frequency is used, there is no need to filter out complex intermodulation products or beat signals.

As shown in FIG. 11, however, a problem still arises relating to the size of the servo regions, particularly in the regions where the servo signals have an azimuth at an angle to the longitudinal axis of the tape. FIG. 11 is an enlarged view of several tracks recorded in the format of FIG. 10 and showing the azimuthal orientation of the recorded information.

In the illustrated example, the servo signals $A_T$, $B_T$ are recorded by heads having an azimuth angle such that in the top region the azimuth creates a substantial angle with respect to the longitudinal axis of the tape. In the bottom servo region, the azimuth of the recorded servo signals $A_B$, $B_B$ is substantially parallel to the longitudinal axis of the tape.

When a read head R passes along a track, that head covers one data track and will partially overlap an adjacent data track. In the servo regions, if there was not an adequate separation between the servo bursts in the adjacent tracks, one read head would sense signals from two adjacent tracks at the same time, skewing the error signals calculation. It therefore is necessary to provide a separation between each pair of the A and B servo signals, in the circumferential direction, to insure that the timed sampling of the signal from each servo-read head R does not simultaneously include servo signals from two adjacent tracks.

In the region where the azimuth is parallel to the longitudinal axis of the tape (the lower region in the illustrated example), the separation distance is entirely vertical. The total distance for the servoing function may be considered as equal to the vertical width of two servo burst (A+B) plus the vertical separation.

In the region where the azimuth is at a substantial angle with respect to the longitudinal axis of the tape (the upper region in the illustrated example), however, the total servo function width is greater. The tilt angle of the recording azimuth actually increases the vertical dimension of each servo burst as well as that of the separation distance between the servo bursts.

As shown by the above discussion of the prior art and applicant's own earlier servo control system and recording format, a need still exists for a data format and servo control system for an arcuate scanner that provide simple accurate servo control of an arcuate scanner while at the same time minimizing the tape space occupied by the servo signals.

SUMMARY OF THE INVENTION

The present invention overcomes the above noted problems in arcuate scanning data storage and retrieval, particularly that relating to tape space occupied by servo signals, by always writing the servo signals so as to have an azimuth substantially parallel to the longitudinal axis of the recording medium. The present invention entails methods and scanner systems for reading and/or writing servo and data information to a tape medium in this manner, as well as tapes bearing information recorded in this format.

Thus, in one aspect, the present invention relates to a method of writing data onto a recording medium. This method includes the step of rotating an arcuate scanner head assembly about an assembly axis. The arcuate scanner head assembly comprises a plurality of write heads. Each write head is radially mounted on the assembly. The recording medium moves longitudinally and across the assembly axis. Each write head, in a subset of the plurality of write heads, is activated as it passes through an arc across the recording medium. In this manner, the head records a track comprising data and a servo signal at one of a plurality of predetermined locations along the arc. Each of the recorded servo signals has an azimuth substantially parallel to the longitudinal axis of the medium.

The present invention also contemplates methods of reading arcuate data. In this aspect, the method invention includes activating a first read head as it passes across the medium to read a track comprising data and at least one signal recorded in a servo region of the recording medium. A second read head is activated as it passes across the recording medium to read another track comprising data and at least one signal recorded in a servo region of the recording medium. Each of the read heads has an azimuth which is substantially parallel to the longitudinal axis of the medium when reading one of the recorded servo signals.

During reading operations, the signal from each head operative to read servo signals is sampled in one or more predetermined time windows, to obtain amplitude signals corresponding to detected servo signals. For example, during reading by one head, a first sample amplitude of servo burst signal is taken during a first predetermined time window. This sample represents a servo burst signal recorded along a predetermined track. During a second predetermined time window, a second sample amplitude of servo burst signal is taken from the output of the one read head. The second sample represents a servo burst signal recorded along a track adjacent to the predetermined track. The arcuate scanner system controls a parameter of its operation in response to a relationship of the first sample amplitude to the second sample amplitude.

In one embodiment utilizing upper and lower servo regions, the parallel azimuth servo signals have a smaller vertical dimension and require a smaller vertical separation, e.g. smaller than exhibited in the upper servo region in the format of FIG. 11. In this embodiment of the present invention, alternate write heads and alternate read heads have two different azimuths. Heads having the first azimuth will read or write in such a manner that recorded signals have an azimuth substantially parallel to the longitudinal axis of the tape in a region adjacent to one edge of the tape. Heads having the second azimuth will read or write in such a manner that recorded signals have an azimuth substantially parallel to the longitudinal axis of the tape in a region adjacent to the other edge of the tape. In this embodiment, each head writes or reads one servo region adjacent one of the edges of the tape and writes or reads data where the azimuth for the head is substantially parallel to the longitudinal tape axis.

In the first embodiment, the system samples servo frequency signals in predetermined time windows corresponding to two servo burst positions within each of the two servo regions. Error signals are developed as a function of the relative amplitudes of the two bursts detected in each servo region. Typically, these servo signals modulate or correct operations of the scanner system, including tape speed and scanner pointing alignment (e.g. tilt angle).

In a second embodiment, there is only one tape region containing servo signals, for example along the lower portion of the tape. The elimination of one servo region frees up more space for use in storing data. The servo functions are based on sampling of servo signals in the one servo region as well as on an envelope detection of recorded track information.

The foregoing and other features, aspects and advantages of the present invention will become more apparent from the following detailed description of the present invention when taken in conjunction with the accompanying drawings.

DETAILED DESCRIPTION OF THE ILLUSTRATIVE EMBODIMENTS

Figure 1:
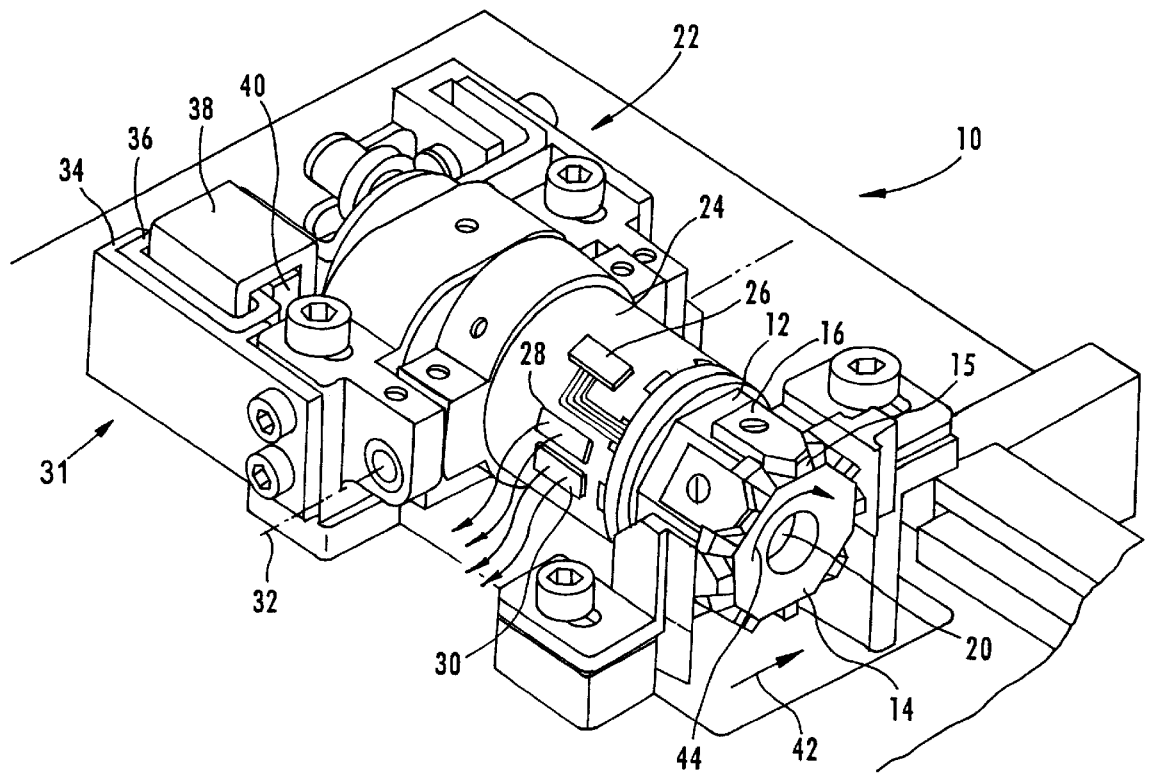
FIG. 1 is a diagram of an arcuate scanner of a tape drive, operating in accordance with an embodiment of the present invention.

FIG. 1 depicts a perspective view of an arcuate scanner head assembly (ASHA) 10 which writes and reads a sequence of arcuate tracks on a recording tape. The scanner 10 has a drum 12 with an end face 14 at which a plurality of read and write transducers are mounted on support blocks 16. A magnetic transducer 15 is mounted at the forward tip of each support block 16. The drum 12 is rotated by a rotatable shaft 20 which is mounted for rotation in a motor/bearing assembly, generally indicated by reference numeral 22. Electrical signals are transferred to and from the transducers on the drum 12 by a conventional rotary transformer assembly having a rotary piece and a stator piece (not visible in the illustrated view). The drum 12 (with the rotor) is fixed to rotate with the shaft 20. The housing 24 and stator are stationary with respect to the shaft 20. As the shaft 20 rotates together with the rotor and drum 12, electrical signals are written to and read from arcuate tracks on the recording tape by a signal path which includes the electromagnetic flux couplings between the rotor and stator. The housing 24 is essentially cylindrical and encloses the motor structure providing rotational power to the shaft 20.

The windings of the stator connect to wiring pads, one of which is shown as reference numeral 26 on the outer surface of the motor/bearing housing 24. The wiring pads 26 provide electrical connection through wiring to circuit elements.

Sensors 28 and 30 are also mounted to the housing 24 and provide, respectively, an index signal and a shaft rotational speed signal (tachometer) for each full rotation of the shaft 20.

Two different types of angles, that are critical to proper reading and writing operations in arcuate scanners, are discussed herein. The first type of angle relates to various rotational angles, i.e. of the various scanner heads, about the central axis of the arcuate scanner head assembly. Commutation functions are controlled as a function of the rotational angle relative to the index. The other critical angle is the tilt angle of the arcuate scanner head assembly. The tilt angle affects the alignment of the scanner with the tape.

The scanner 10 is positioned at a recording location so that the planar end face 14 of the drum 12 faces a tape on which a sequence of arcuate tracks is to be written or read. The end face 14 is adjusted with respect to the edges of the tape by pivoting the housing 24, and with it the drum 12, about a pivot axis 32. The tape moves past the end face 14 in a direction indicated by arrow 42 and the drum 12 rotates in the direction of arrow 44.

A tilt motor 31 controls the angular tilting of the scanner 10 with respect to the tape. The tilt motor 31 includes a stationary bracket 34 that carries on its rear portion a conventional voice coil 36 with an open center. A U-shaped bracket 38 is affixed to the rear end of the motor/bearing housing 24 by another U-shaped bracket (not illustrated). The U-shaped bracket 38 has one leg which is received in the center of the voice coil 36 and another leg to which a permanent magnet 40 is attached. Current through the voice coil 36 sets up a magnetic field in its open center which is conducted in the U-shaped bracket 36 to the permanent magnet 40. An electromotive force is exerted on the U-shape bracket 36 and its attached magnet 40 having a magnitude determined by the magnitude of the field induced in the coil 36. The scanner 10 pivots above the pivot axis 32 by an angular amount that depends upon the relative strengths of the voice coil 36 field and the field of the permanent magnet 40, thereby selectively positioning the axis of rotation on which the shaft 20 and drum 12 rotate.

Alternative embodiments of the present invention provide other tilt or alignment mechanisms, such as a servo motor, or oppositely directed magnetic coils, as appreciated by one of ordinary skill in the art. The present invention is not limited to controlling the tilting of the scanner to control the pointing of the scanner at the recording tape. Other embodiments of the invention provide other methods of controlling the pointing position of the scanner head relative to the tape. These include controlling the elevation of the scanner with an elevator mechanism, or providing a side swing mechanism for the scanner, as one of ordinary skill in the art will appreciate.

Figure 2:
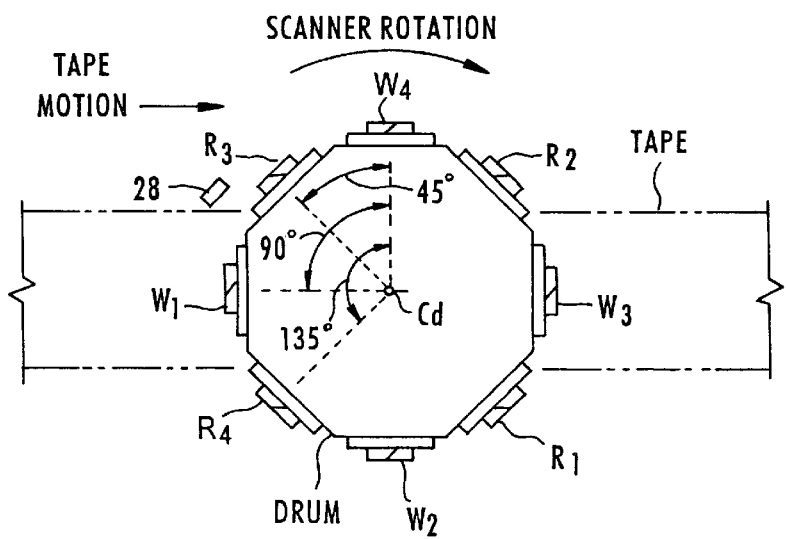
FIG. 2 is front view of the arcuate scanner head assembly (ASHA), of the scanner of FIG. 1, showing the angular relationship of the read and write heads and the passage of a tape past the head assembly.

FIG. 2 is a view through a tape at the reading location towards the planar end face of the ASHA scanner drum. As shown, there are eight transducers mounted with their active surfaces extending slightly through a plane at the end face of the drum. A somewhat different notation is used herein than was used in the above discussion of Lemke et al. Four transducers are designated as write transducers and are identified as $W_1$, $W_2$, $W_3$ and $W_4$. In addition, there are four read transducers identified as $R_1$, $R_2$, $R_3$ and $R_4$. Identical subscripts identify write/read transducer pairs in which the track written by numbered transducer W is later read by correspondingly numbered transducer R. For example, the transducer $W_1$ writes a track that the transducer $R_1$ later reads.

Further, the write transducers are arcuately spaced on the drum by 90° in the order in which they write tracks on the tape, which is $W_1$, $W_2$, $W_3$ and $W_4$. Similarly, the read transducers are spaced from each other by 90°, but are spaced from adjacent write transducers by 45°. Further, read transducer $R_1$ is displaced by 135° in the direction opposite the scanner rotation direction from write transducer $W_1$. The sequence traced across the tape from edge to edge when the scanner rotates in the direction indicated in FIG. 2 is: $W_4$, $R_3$, $W_1$, $R_4$, $W_2$, $R_1$, $W_3$, $R_2$.

Write heads $W_1$ and $W_3$ are oriented to write at a first azimuth angle on the tape, and read heads $R_1$ and $R_3$ read information recorded at the first azimuth angle. Write heads $W_2$ and $W_4$ are oriented to write at a second azimuth angle on the tape, and read heads $R_2$ and $R_4$ read information recorded at the second azimuth angle. As thus described, when the tape speed is matched to an appropriate rotational velocity of the drum, the write transducers, when energized, will trace a sequence of contiguous recorded arcuate tracks with alternating azimuthal orientation. Similarly, the read heads sense recorded information from a sequence of arcuate tracks with alternating azimuthal orientation.

Figure 3A:
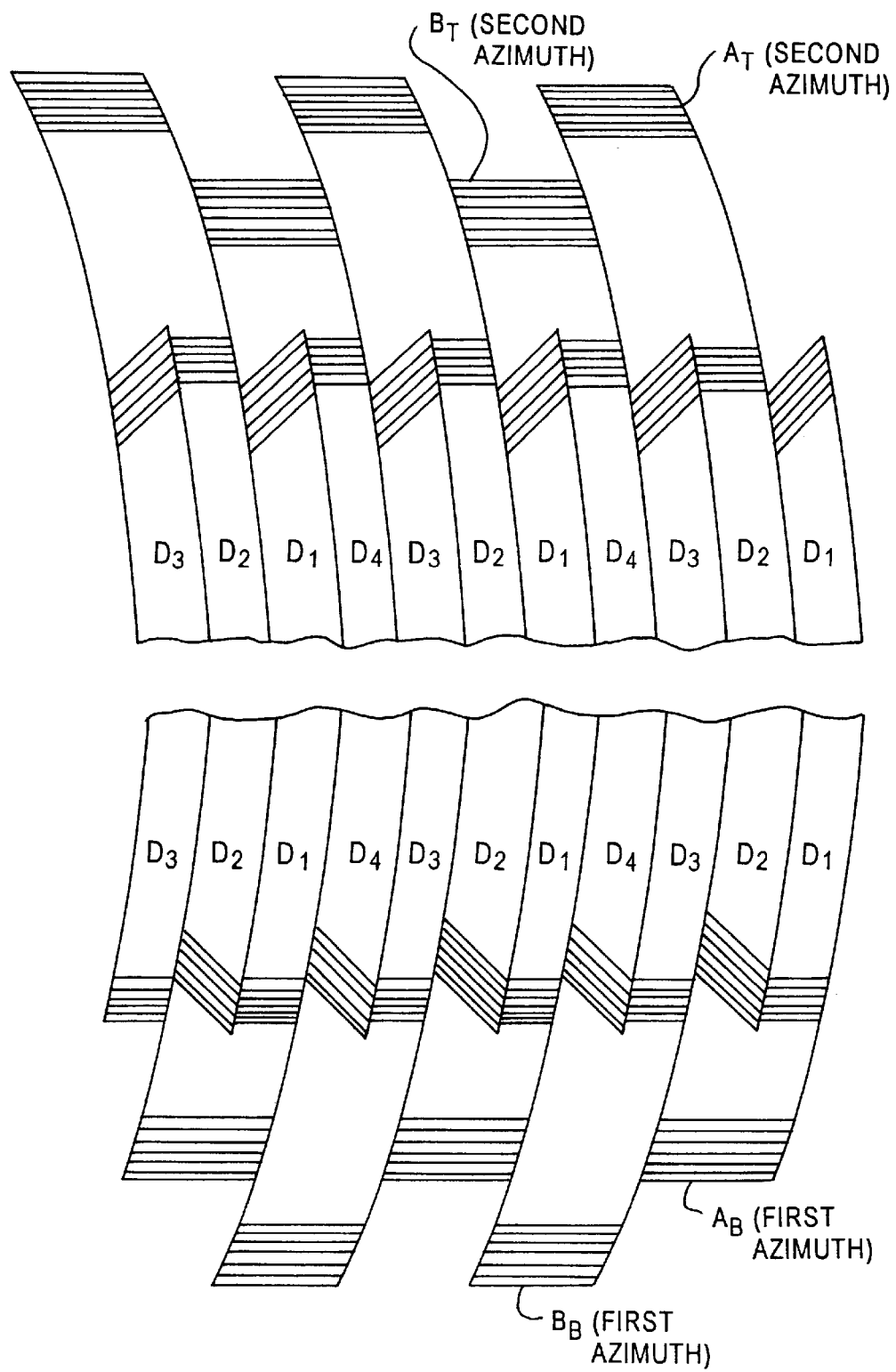
FIG. 3A is a diagram of the information recorded on the tape, showing azimuthal angles of the recorded information.

In accord with the present invention, all servo signals are recorded so that the azimuth thereof in the respective servo regions is substantially parallel to the longitudinal axis of the tape. FIG. 3A illustrates the azimuthal angles of the recorded information, particularly the servo bursts, in accord with a first embodiment of the invention. The azimuthal orientation of the data is shown only at the ends of the data tracks, for simplicity of illustration. As shown, the first embodiment utilizes both top and bottom servo burst signals, in a manner similar to applicants earlier invention. However, the servo signals are flat in both servo regions.

In accord with the first embodiment, all write and read heads perform both data related operations and servo related operations. For the servo operations, however, each head operates in only one servo region, i.e. the region in which the head azimuth is substantially parallel to the longitudinal tape axis. No one head writes servo bursts in both the top and bottom regions.

The first write head $W_1$ writes a data track $D_1$ and a lower region servo burst $A_B$. The second write head $W_2$ writes an upper region servo burst $A_T$ and a data track $D_2$. The third write head $W_3$ writes a data track $D_3$ and a lower region servo burst $B_B$. The fourth write head $W_4$ writes an upper region servo burst $B_T$ and a data track $D_4$. This sequence of write operations repeats along the length of the tape. These write operations are discussed in more detail below with regard to FIGS. 4A to 4D.

As noted, the bursts $A_T$ and $B_T$ in the top servo region are written by heads $W_2$ and $W_4$ and read by read heads $R_2$ and $R_4$. All of these heads are aligned at the first azimuth angle, and the resulting servo burst recordings exhibit the first recording azimuth with respect to the tape. In the top servo region, the azimuth angle of these heads and the recorded servo signals is substantially parallel to longitudinal axis of the tape.

The bursts $A_B$ and $B_B$ in the bottom servo region are written by heads $W_1$ and $W_3$ and read by $R_1$ and $R_3$. All of these heads are aligned at the second azimuth angle, and the resulting servo burst recordings exhibit the second recording azimuth with respect to the tape. In the lower servo region, the azimuth angle of these heads and the recorded servo signals is substantially parallel to longitudinal axis of the tape.

As a result of these servo azimuths, the tape width occupied by the servo bursts and the separation therebetween is minimized in both servo regions.

Figure 3B:
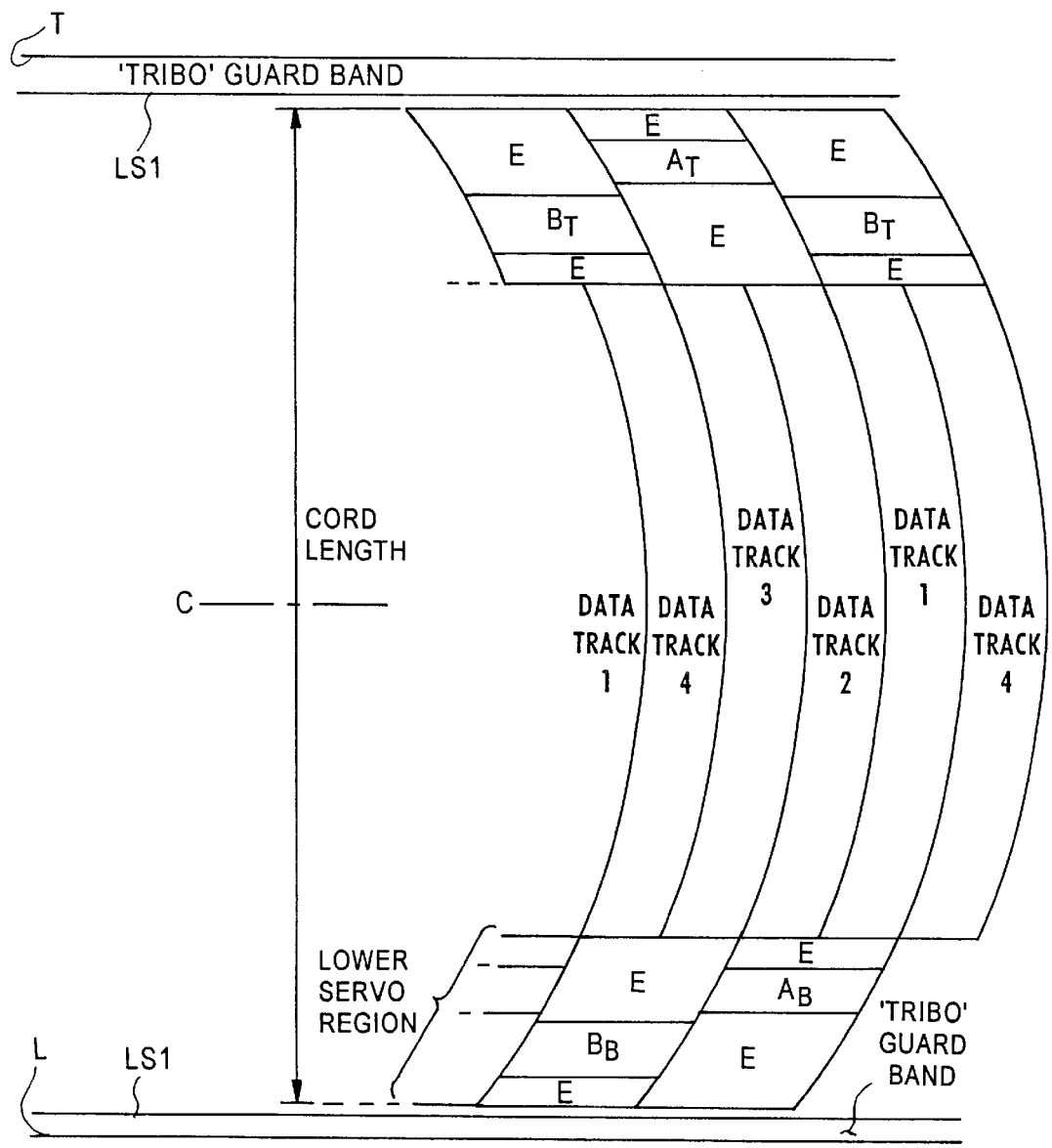
FIG. 3B is a diagram of the format of information recorded on the tape, when viewed through the tape toward the planar surface end of the arcuate scanner head assembly in FIG. 2.

FIG. 3B shows the exemplary format of the information on the developed tape in somewhat simplified form, as viewed through the tape looking towards the end face of the ASHA scanner drum in FIG. 2. It should also be noted that the various regions on the tape are not drawn to scale.

As shown in FIG. 3B, the 'TRIBO' interface standard specifies a region along the top edge T of the tape as a guard band. A similar guard band extends along the lower edge L of the tape. The top guard band typically is 15 mils wide, and the lower guard band typically is 10 mils wide. Each TRIBO guard band extends for the full length of the tape. The arcuate scanner type data recording system will not write data in the guard bands.

Along the inner edge of each guard band is a magnetic stripe, designated an LS1 stripe. The tape cartridge manufacturer deeply records the LS1 stripes along the entire length of the tape. The present invention utilizes the lower LS1 stripe as a reference point as will be discussed in more detail later. The upper LS1 stripe is not strictly necessary for the present invention, but its inclusion is exemplary.

The recorded sections of the tape are spaced from the upper and lower guard bands and LS1 stripes by a specified distance, e.g. 1.0 mils.

The actual data tracks are bounded by a top servo region and a lower servo region. In the developed tape product with information recorded thereon, the servo regions or tracks are approximately twice as wide as the data tracks when measured in the direction of the longitudinal tape axis. Within these regions bursts A and B of servo frequency signals are recorded at predetermined locations.

During the writing operation, the scanner writes predetermined amounts of erase signals before and after the respective servo bursts. During a subsequent read operation, a predetermined read head partially overlaps data tracks in such a manner that it detects differing predetermined amounts of the A and B servo bursts during different time windows. The scanner system uses comparisons of the detected amplitudes of the various A and B servo bursts as a servo control, e.g. for servo control of tape speed and/or ASHA tilt angle.

This tape format is generally similar to that disclosed in applicant's earlier case. However, because of the recording of top and bottom servo bursts by alternate heads, the top and bottom servo bursts A and B are longitudinally offset by one data trace pitch.

All timing and orientation functions for servo control, data read commutation, and data write sampling are based on detection of the lower LS1 stripe and various known positional relationships between the ASHA components, as described in detail in commonly assigned copending application Ser. No. 08/557,772 filed Nov. 13, 1995 entitled "Method and Arrangement for Servoing and Formatting Magnetic Recording Tape" (attorney docket no. 2674-014), the disclosure of which is incorporated herein entirely by reference.

The recorded information on the tape forms arcs. A straight line across an arc, extending from one end to the other, forms a chord. For a tape of a given width having known guard bands and predetermined spacing from the edges of the guard bands, the chord length becomes a known value. For example, for common quarter inch magnetic recording tape, the tape is typically about 247 mils wide. The top guard band is 15 mils, the lower guard band is 10 mils, the desired spacing from the top guard band is 1 mil, and the desired spacing from the lower guard band is 1 mil. The chord length therefore should be about 220 mils.

During both reading and writing to the tape, it is critical to maintain alignment of the center of the ASHA with the center of the information recording area, shown as center line C in FIG. 3B. This center line C generally passes through the center of the chord length of each recorded arc. Because of the differences in the guard band dimension, the center line C does not coincide with the physical center line of the tape. In the above example, the chord length is 220 mils. The center of the chord is 110 mils from either end of the arc, or approximately 111 mils above the lower LS1 stripe. The referencing to the LS1 stripe described in detail in the above-cited copending case maintains the desired alignment of the ASHA with the center line.

FIGS. 4A to 4D together illustrate the recording of a sequence of tracks on the tape in accord with the present invention. For convenience of illustration, these drawings do not show the curvature of the arcuate tracks. The various write heads are approximately twice as wide as the desired data track width in the direction of the longitudinal tape axis.

As noted above, in this embodiment, two of the write heads $W_1$ and $W_2$ write bottom servo information as well as data. The other two write heads $W_2$ and $W_4$ write top servo information as well as data. During reading operations, the read heads $R_1$ and $R_2$ read bottom servo information as well as data, and the read heads $R_2$ and $R_4$ read top servo information as well as data. The write heads $W_1$ and $W_3$ are oriented to write at a first azimuth angle on the tape, and read heads $R_1$ and $R_3$ read information recorded at the first azimuth angle. Write heads $W_2$ and $W_4$ are oriented to write at a second azimuth angle on the tape, and read heads $R_2$ and $R_4$ read information recorded at the second azimuth angle.

Figure 4A:
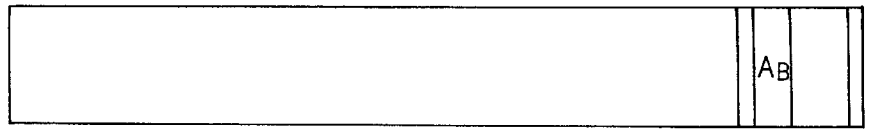
FIGS. 4A to 4D illustrate the process of writing a sequence of four tracks on the tape, to produce an information format in accord with the present invention.

In a writing operation, the first write head $W_1$ passes down across the tape (left to right in the drawing) and records a sequence of signals on the tape, as shown in FIG. 4A. It will be apparent that the write head $W_1$ passes over the upper servo region, but in this region, write head $W_1$ is not activated and writes no signals.

After passing the upper servo region, the write head $W_1$ reaches a point on the tape where data should begin. The scanner system controller therefore supplies data and format signals to the write head $W_1$, and that head begins recording the data on the tape. Specifically, the head records a pad, followed by a series of blocks of data separated by pads, and followed by a final pad.

After writing the data and the final pad, the first write head $W_1$ reaches the lower servo region. In this region, the write head $W_1$ records a pad of erase signal information at frequency f followed by another predetermined burst of servo frequency signal, e.g. at f/4. This lower region servo burst is located nearer to the recorded data than to the bottom of the information recording area and is designated as servo burst '$A_B$'. After the lower servo burst $A_B$, the write head $W_1$ records another erase signal pad to complete the lower servo region. At this point, the scanner system controller deactivates the writing operation through the first write head $W_1$, approximately 1 mil above the lower LS1 stripe.

The first write head $W_1$ writes all of the information shown in FIG. 4A at a first azimuth angle with regard to the longitudinal axis of the tape. All information recorded at that angle is readable by read heads oriented at the same azimuth angle, e.g. read heads $R_1$ and $R_3$. In accord with the present invention, the azimuth of the information recorded in the lower servo region, including that of the servo burst $A_B$ is substantially parallel to the longitudinal axis of the tape.

The second write head $W_2$ subsequently passes down across the tape (left to right in the drawing) and records a sequence of signals on the tape, as shown in is FIG. 4B. First the write head $W_2$ records a pad of erase signal information at frequency f. Next, the write head $W_2$ records a predetermined burst of servo frequency signal, e.g. at f/4. The servo burst is written at a specific location on the track. In this write operation, this servo burst is in the top servo region and within that region is nearer to the top edge of the information area on the tape. This first top servo burst is designated as servo '$A_T$' (See also FIG. 3B).

After the servo burst $A_T$, the second write head $W_2$ records another predetermined amount of the erase signal to fill the remaining portion of the top servo region for the present recording pass. At this point, the write head $W_2$ reaches a point on the tape where data should begin. The scanner system controller therefore supplies data to the write head $W_2$, and that head begins recording the format and data signals on the tape. The head records a pad, followed by a series of blocks of data separated by pads, and followed by a final pad.

The scanner system controller deactivates the write head $W_2$ after completion of the writing of the data track. The second write head $W_2$ does not write any information as it passes across the lower servo region of the tape.

The width of the write heads is approximately twice the final track pitch or width. The information written by the first write head $W_1$ is the same width as that head and therefore is approximately two tracks wide. When the second write head $W_2$ begins writing, the tape has moved only one track pitch. As shown, the second write head $W_2$ writes the second track of data overlapping the first track of data by a predetermined amount, e.g. about fifty percent, thereby trimming the track written by write head $W_1$.

Figure 4B:
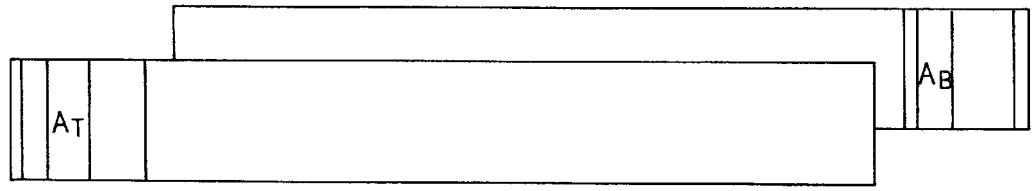

The second write head $W_2$ writes the track comprising the upper servo and the second data shown in FIG. 4B at a second azimuth angle with regard to the longitudinal axis of the tape. All information recorded at that angle is readable by read heads oriented at the same azimuth angle, e.g. read heads $R_2$ and $R_4$. In accord with the present invention, the azimuth of the information recorded in the upper servo region, including that of the servo burst $A_T$, is substantially parallel to the longitudinal axis of the tape.

Figure 4C:
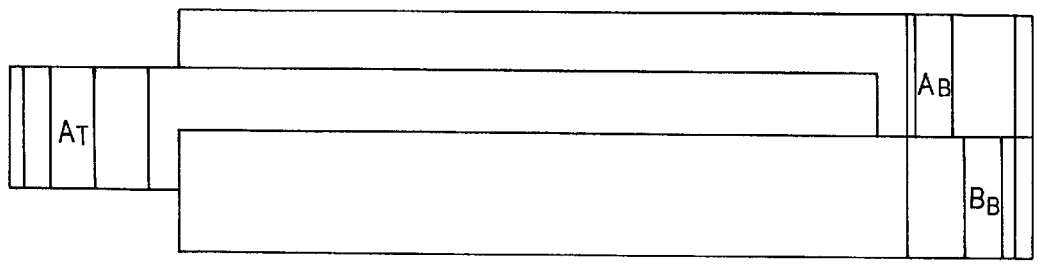

The third write head $W_3$ subsequently passes down across the tape and records a sequence of signals on the tape (FIG. 4C). This sequence of data and servo signals is similar to those recorded by the first write head $W_1$, but as discussed below, the servo burst is located at a different point.

First, the write head $W_3$ records a data track in the same manner and at the same azimuth as was recorded by write head $W_1$. After writing the data, the third write head $W_3$ reaches the lower servo region. In this region, the write head $W_3$ records a pad of erase signal information at frequency f followed by another predetermined burst of servo frequency signal, e.g. at F/4. In this lower region, the servo burst is located nearer to the lower edge of the information recording area on the tape and farther from the recorded data and is designated as servo '$B_B$'. After the lower region servo burst $B_B$, the write head $W_3$ records another erase signal pad to complete the lower servo region. At this point, the scanner system controller deactivates the writing operation through the third write head $W_3$, approximately 1 mil above the lower LS1 stripe.

When the third write head $W_3$ begins its operation, the tape again has moved a distance of approximately one track pitch. The third write head $W_3$ therefore writes the third track overlapping the second track by approximately fifty percent. The third write head $W_3$ writes all of the information shown in FIG. 4C at the first azimuth angle with regard to the longitudinal axis of the tape. All information recorded at that angle is readable by read heads oriented at the same azimuth angle, e.g. read heads $R_1$ and $R_3$. Again, the azimuth of the information recorded in the lower servo region, including that of the servo burst $B_B$, is substantially parallel to the longitudinal axis of the tape.

Figure 4D:
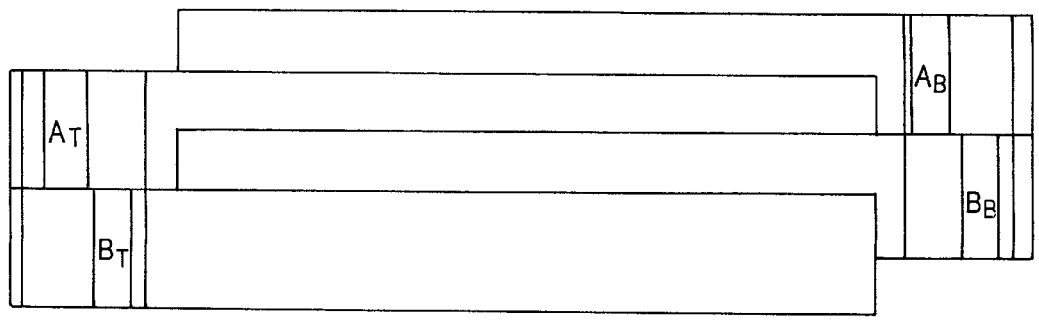

The fourth write head $W_4$ operates in essentially the same manner as the second write head $W_2$, discussed above. As the fourth write head $W_4$ passes down over the tape, that head writes another track including upper servo information followed by data, all at the second azimuth. The fourth write head $W_4$ writes that track overlapping the third data track as shown in FIG. 4D. The fourth write head $W_4$ writes the fourth data track at the second azimuth angle. The information recorded at that angle in the fourth track is readable by read heads oriented at the same azimuth angle, e.g. read heads $R_2$ and $R_4$. Again, the azimuth of the information recorded in the upper servo region, including that of the servo burst $B_T$, is substantially parallel to the longitudinal axis of the tape.

The track recording sequence illustrated in FIGS. 4A to 4D repeats for each rotation of the ASHA during a data recording operation. Preferably, the read heads alternately scan the recorded tracks during the data recording operation. Although not shown, error detection circuitry responsive to the signals sensed by the read heads detects errors, if any, in the recorded tracks. In response to the errors, the system can re-record data.

In accord with the present invention, the use alternate heads to record top and bottom servo signals to thereby present flat azimuth recordings thereof reduces the space on the tape occupied by those signals. This increases the amount of space for data recording and thus the amount of recorded data in each track. The added space may be used to increase the number of blocks of data in each track, or the added space may be occupied by increased amounts of user data in each block. A summary discussion of the format of the data blocks recorded in the data tracks appears below.

The data block begins with a format timing mark (FTM). The FTM is a predetermined sequence of '1s' and '0s' indicating the start of the data block. In the preferred embodiment, the FTM comprises four intervals with eight '0s' between '1s'. As the read head passes over a data track, the associated signal processing circuitry looks for this unique sequence of '1s' and '0s' in predetermined time windows when the start of blocks of data are expected. The processing circuitry will process the bits following a detected FTM on the assumption that the bits are arranged in accord with the illustrated data block format.

After the FTM, the data block includes a 15 byte preamble followed by a 4 byte training sequence. Next, the block includes a sequence of three bytes comprising a first byte of synchronization information, another training byte and a second byte of synchronization information.

The data block next contains 8 bytes of search data followed by a two byte Search EDC signal. The search information in these portions of the data block facilitate high speed search operations.

After the search data, the data block includes a format control word (4 bytes) followed by at least 220 bytes of actual user data. After the user data, the data block includes 4 bytes of level EDC information and ends with 24 bytes of level ECC data. The end of the data block is followed by a padding signal separating the data block from the next information recorded information, e.g. from the next data block or from the erase signal at the start of the lower servo region.

In accord with the present invention, a number of parameters effecting read and write operations of the arcuate scanner system are servo controlled in response to detection of relative amplitudes of the servo bursts. The read heads are somewhat wider than the data track width. When properly centered on a track, a read head will overlap slightly onto adjacent track areas. In the data areas, because of the different azimuth angles during recording, the read head picks up the signals only from the data track it is reading, i.e. the data track written using the azimuth angle corresponding to that of the particular read head. For read heads $R_1$ and $R_3$, the heads are oriented at the same azimuth angle as the servo and data write heads $W_1$ and $W_3$, therefore the read heads $R_1$ and $R_3$ pick up data and lower region servo signals recorded at the first azimuth. Similarly, the read heads $R_2$ and $R_4$ will sense upper region servo signals and data recorded at the second azimuth angle. Because the read heads are wider than one data track, each of the read heads will pick up some portion of an A servo signal and some portion of a B servo signal, albeit at different times. The various tracking functions are then controlled by determining the proportional amount of each A and B signal picked up by each of the read heads.

Consider the read head $R_2$ as an example, and assume that head is centered to read data track 2 in FIG. 3B. As that head passes over the top servo region, signals from the head are sampled in a first servo time window, selected to be within the period that the head should go past the servo region $A_T$. The head overlaps the $A_T$ servo burst by some relatively large amount, e.g. 70% if property aligned. During a second servo time window, selected to be within the period that the head should go past the servo region $B_T$, signals from the read head are sampled again. When centered on the data track 3, the read head $R_3$ should overlap the servo region $B_T$ small relatively large amount, e.g. 30% if properly aligned.

The exemplary relationship between A and B servos is 30/70 (or 70/30 for read by head $R_4$), though the relationship may range from 40/60 to 20/80. A determination of the relationship of the actual sampled amplitudes can then be used to produce an error signal indicating a difference from the amplitude relationship expected when the currently operative read head is centered over the corresponding data track. A similar error signal can be developed by time window sampling of the servo bursts $A_B$ and $B_B$ in the lower servo region by each of the read heads $R_1$ and $R_3$.

The error signals then control various scanner parameters effecting tracking, such as tape speed and ASHA pointing alignment (e.g. tilt angle). Specific control operations are described in detail below.

Figure 5:
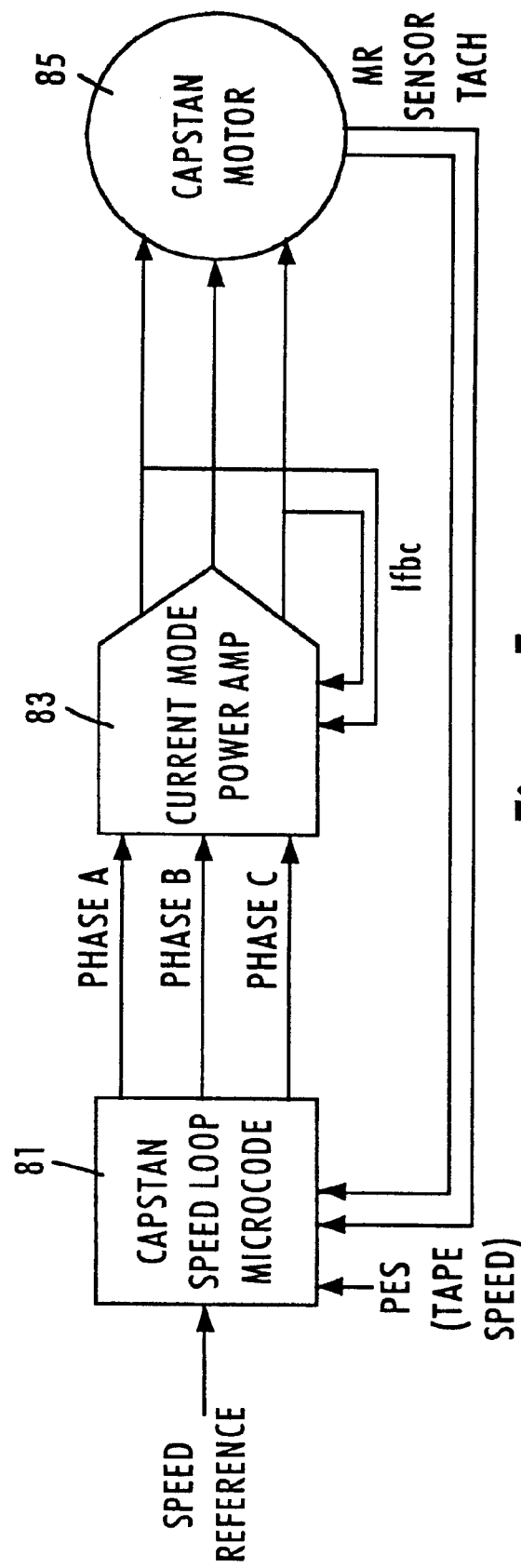
FIG. 5 is a functional/logic diagram of the tape speed control used with the invention during a write operation.

FIG. 5 is a simplified functional block diagram of the control loop for controlling the tape speed, and the operation of that loop will be discussed first for a write operation. The capstan motor 85 moves the tape. A current mode power amplifier 83 (sine/cosine type driver) provides drive signals to the capstan motor 85. Variations in the driver signals from the current mode amplifier 83 cause changes in the speed of the capstan motor 85 and therefore in the speed of the recording tape. The current controlled motor 83 operates in a feedback controlled loop.

A microcontroller (not shown) runs a capstan speed loop 81 as part of its microcode program controlled operations. The capstan speed loop microcode 81 outputs three signals representing the phase inputs A, B and C to the current mode amplifier 83. The three phase signals are analog signals, either produced directly by the microcontroller itself or by three digital to analog converters (not separately shown).

The Phase A, B and C signals effectively specify the desired speed of the capstan motor 85 and thus the tape speed.

On the capstan motor 85, there is a magneto-resistance (MR) sensor. The MR sensor is a sine/cosine type of sensor. The zero crossings of the sensor output signal provide speed related information (tachometer). The amplitude of the sensor output signal provides position information.

The capstan speed loop microcode 81 receives a reference signal and the MR sensor signal and controls the capstan motor 85 through the amplifier 83 to run a tape capstan at a constant speed, e.g. to provide 0.717 in/s tape speed. A write operation utilizes this constant capstan speed. During a read operation, however, the capstan speed is modulated to correct tracking errors in response to the servo signals, as discussed in more detail below. For this purpose, during the read operation, the capstan speed loop microcode 81 also is responsive to a tape speed position error signal (PES).

Figure 6:
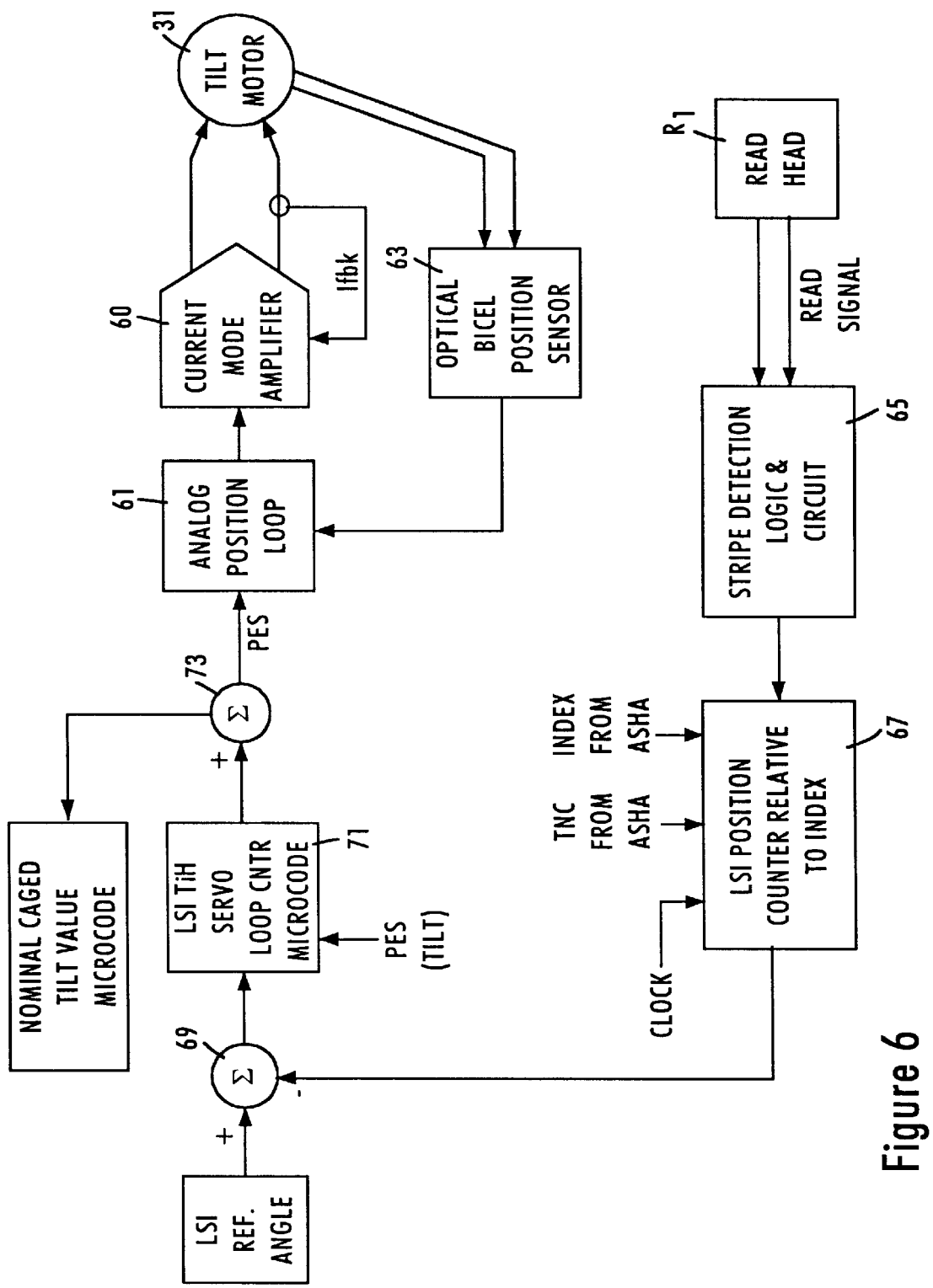
FIG. 6 is a functional/logic diagram of the servo control of the tilt angle of the arcuate scanner head assembly during a write operation, in accord with the invention.

FIG. 6 is a simplified functional block diagram of the control loop for controlling the tilt angle. For simplicity of discussion, this drawing shows only one read head $R_1$, but it will be readily apparent that similar processing occurs with respect to other heads on the ASHA.

The ASHA 10 has a tilt motor 31, for example, comprising the elements 34, 36, 38 and 40 of FIG. 1. The tilt motor 31 responds to signals from a current mode amplifier to adjust the tilt angle of the ASHA 10. An analog position loop 61 provides a control current signal to the current mode amplifier 60. An optical position sensor 63 detects the actual position of the ASHA produced by the tilt motor 31 and supplies a position sensor signal to the analog position loop 61. The analog position loop 61 also is responsive to a position error signal (PES).

The tilt control of the present invention operates during both read and write operations to maintain proper alignment. Consider first a write operation.

In operation, one of the read heads crosses the lower LS1 stripe, e.g. read head $R_1$. The read head $R_1$ supplies signals to stripe detection logic and associated circuitry 65. The stripe detection logic and circuitry 65 produces a pulse signal in response to the passage of the read head $R_1$ over the magnetized lower LS1 stripe. If two similar LS1 stripes are provided on the tape, e.g. upper and lower stripes as in FIG. 3, then the logic and circuitry 65 will differentiate between the two, for example based on a timing or sequence analysis.

The stripe detection logic and circuitry 65 supplies the LS1 pulse signal to a microcontroller (not shown in detail). Within the microcontroller, a microcode process is running to count position pulses relative to index 28 to identify the LS1 position relative to the index. This microcode routine appears at 67 in FIG. 6. The LS1 position routine 67 receives the LS1 detection pulse, the tachometer (revolutions per minute) reading from the sensor 30, the ASHA index position from the sensor 28 (one per revolution) and a clock signal. From that information, the LS1 position routine 67 produces coarse and fine count values for the position of the LS1 crossing relative to the index.

The count values for the current position are applied to the negative input of a summation circuit 69. The summation circuit 69 also receives coarse and fine values for a reference angle for the LS1 crossing relative to the index.

The summation circuit produces a difference or error signal representing the difference between the measured LS1 position relative to index and the reference LS1 position relative to index. The summation circuit 69 supplies this error signal to another microcode routine 71 of the microcontroller. This routine is the LS1 tilt servo loop control microcode.

The microcode routine 71 produces an analog position error signal (D/A converter not shown), and the analog signal is summed with a reference analog position signal in a second summation circuit 73. The result of this summation goes to the analog position loop 61 as the position error signal (PES). As the LS1 stripe moves up and down during the writing operation, the loop control of FIG. 6 adjusts the current applied to the tilt motor 31 to keep the LS1 angle of the read head constant as measured with respect to the angular rotation index of the ASHA.

All of the tracks are written using the closed loop control of FIG. 6, so that the tracks and the various regions within the tracks all exhibit a specified distance relationship to the lower LS1 stripe. During a read operation, the ASHA pointing alignment (e.g. tilt angle) is modulated to correct tracking errors in response to the servo signals, as discussed in more detail below. For this purpose, during the read operation, the tilt servo loop control microcode 71 also is responsive to a tilt angle position error signal (PES).

The same tape speed control loop (FIG. 5) and tilt angle control loop (FIG. 6) operate during the reading operation. In the reading operation, however, the control signals are modulated with servo responsive position error signals (PESs) to fine tune the tracking. The fine tuning of the tracking relies on timed detection of the servo bursts in adjacent tracks, as discussed below with regard to FIG. 7.

Figure 7:
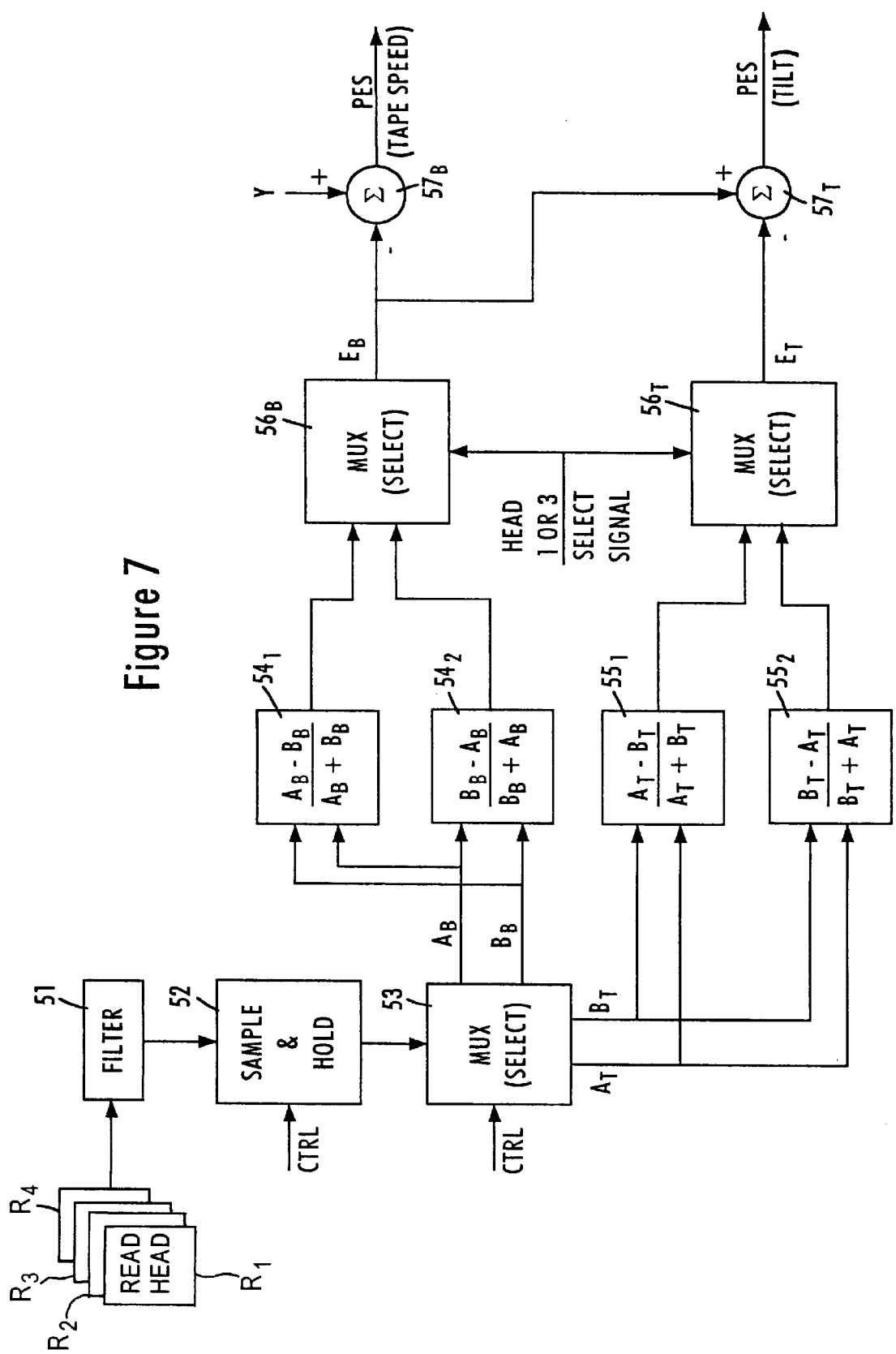
FIG. 7 is a functional/logic diagram of the servo control signal processing for modifying the control functions of FIGS. 5 and 6 during a read operation, in accord with the invention.

FIG. 7 provides a simplified functional/logic block diagram of the system for providing the tape speed PES signal and the tilt angle PES signal for servo control in response to read head pick-up of the servo bursts.

As shown in FIG. 7, output signals from the read heads $R_1$ to $R_4$ designated for servo processing go to a filter 51. The filter 51 is a passband filter for passing signals of the one frequency used for servo bursts. As noted above, the servo frequency signal preferably is produced by dividing the erase frequency signal by an even integer, for example, the servo frequency could be f/4. The filter passes signals in a narrow frequency band centered around that servo frequency, e.g. around f/4.

The output of the filter 51 goes to a sample and hold circuit 52. In response to an appropriately timed control signal from the microcontroller, the sample and hold circuit 52 samples the amplitude of the signal from the filter 51. The sample and hold circuit 52 supplies the sample amplitude to a multiplexer 53. The multiplexer (MUX) 53 serves as a one-in to four-out selector circuit. In response to an appropriately timed control signal, the multiplexer 53 outputs the current sample of the servo amplitude value to a predetermined one of its four outputs. Together, the sample and hold circuit 52 and multiplexer 53 perform a time window controlled sampling function to effectively sample the relative amplitudes of the $A_T$, $B_T$, $A_B$, and $B_B$ servo bursts detected by the respective read heads.

More specifically, during one time window corresponding to a time when a read head $R_2$ or $R_4$ is expected to pass at least partially over the $A_T$ servo burst, the microcontroller supplies the control signal to the sample and hold circuit 52 to sample the servo frequency signal output of the filter 51. The microcontroller also instructs the multiplexer 53 to output the sample to a port assigned for the output of the $A_T$ signal.

During a second time window corresponding to a time when a read head $R_2$ or $R_4$ is expected to pass at least partially over the $B_T$ servo burst, the microcontroller supplies the control signal to the sample and hold circuit 52 to sample the servo frequency signal output of the filter 51. The microcontroller also instructs the multiplexer 53 to output this second sample to a port assigned for the output of the $B_T$ signal.

During another time window corresponding to a time when a read head $R_1$ or $R_3$ is expected to pass at least partially over the $A_B$ servo burst, the microcontroller supplies the control signal to the sample and hold circuit 52 to sample the servo frequency signal output of the filter 51. The microcontroller also instructs the multiplexer 53 to output this third sample to a port assigned for the output of the $A_B$ signal.

During a further time window corresponding to a time when a read head $R_1$ or $R_3$ is expected to pass at least partially over the $B_B$ servo burst, the microcontroller supplies the control signal to the sample and hold circuit 52 to sample the servo frequency signal output of the filter 51. The microcontroller also instructs the multiplexer 53 to output this fourth sample to a port assigned for the output of the $B_B$ signal.

Stated another way, as the read head $R_1$ passes over the lower servo region, the microcontroller activates the sample and hold circuit 52 and the multiplexer 53 during the time window when that head is expected to pass over the $A_B$ burst and during the time window when that head is expected to pass over the $B_B$ burst. Such activation provides output samples representative of the amplitude of the $A_B$ burst and the $B_B$ burst.

As the read head $R_2$ passes over the upper servo region, the microcontroller activates the sample and hold circuit 52 and the multiplexer 53 during the time window when that head is expected to pass over the $A_T$ burst and during the time window when that head is expected to pass over the $B_T$ burst. Such activation provides output samples representative of the amplitude of the $A_T$ burst and the $B_T$ burst.

As the read head $R_3$ passes over the lower servo region, the microcontroller activates the sample and hold circuit 52 and the multiplexer 53 during the time window when that head is expected to pass over the $A_B$ burst and during the time window when that head is expected to pass over the $B_B$ burst. Such activation provides output samples representative of the amplitude of the $A_B$ burst and the $B_B$ burst.

As the read head $R_4$ passes over the upper servo region, the microcontroller activates the sample and hold circuit 52 and the multiplexer 53 during the time window when that head is expected to pass over the $A_T$ burst and during the time window when that head is expected to pass over the $B_T$ burst. Such activation provides output samples representative of the amplitude of the $A_T$ burst and the $B_T$ burst.

The $A_B$ and $B_B$ signals from the multiplexer 53 go to two relative value analysis circuits $54_1$ and $54_2$. The $A_T$ and $B_T$ signals from the multiplexer 53 go to a second pair of relative value analysis circuits $55_1$ and $55_2$. These circuits may be constructed as hard wired analog circuits using operational amplifiers or the like. Alternatively, the sample and hold circuit may supply samples through an analog to digital converter. In this case, the multiplexer 53 is a digital selection circuit for passing a predetermined number of bits to the four outputs, and the relative value analysis circuits 54, 55 are implemented as digital processing loops running in microcode within the microcontroller. Each of the relative value analysis circuits $54_1$, $54_2$, $55_1$ and $55_2$ divides the difference between one pair of the A and B servo signal amplitudes by the sum of those two amplitudes.

Figure 8:
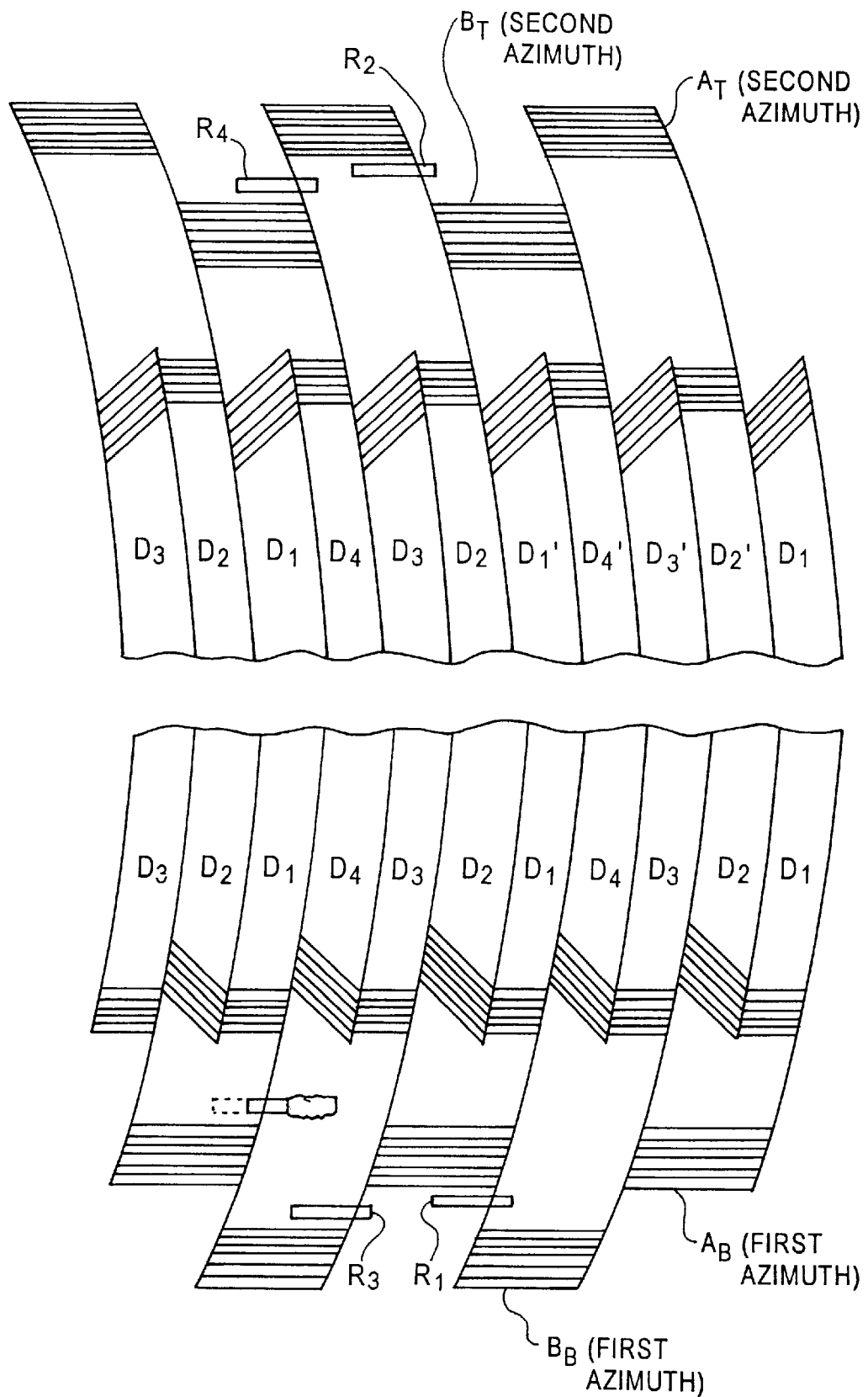
FIG. 8 is a view similar to FIG. 3A, with the additional illustration of the positional relationship of the reads head to the servo tracks those heads process, useful in explaining the operation of the servo control of FIG. 7.
Figure 9:
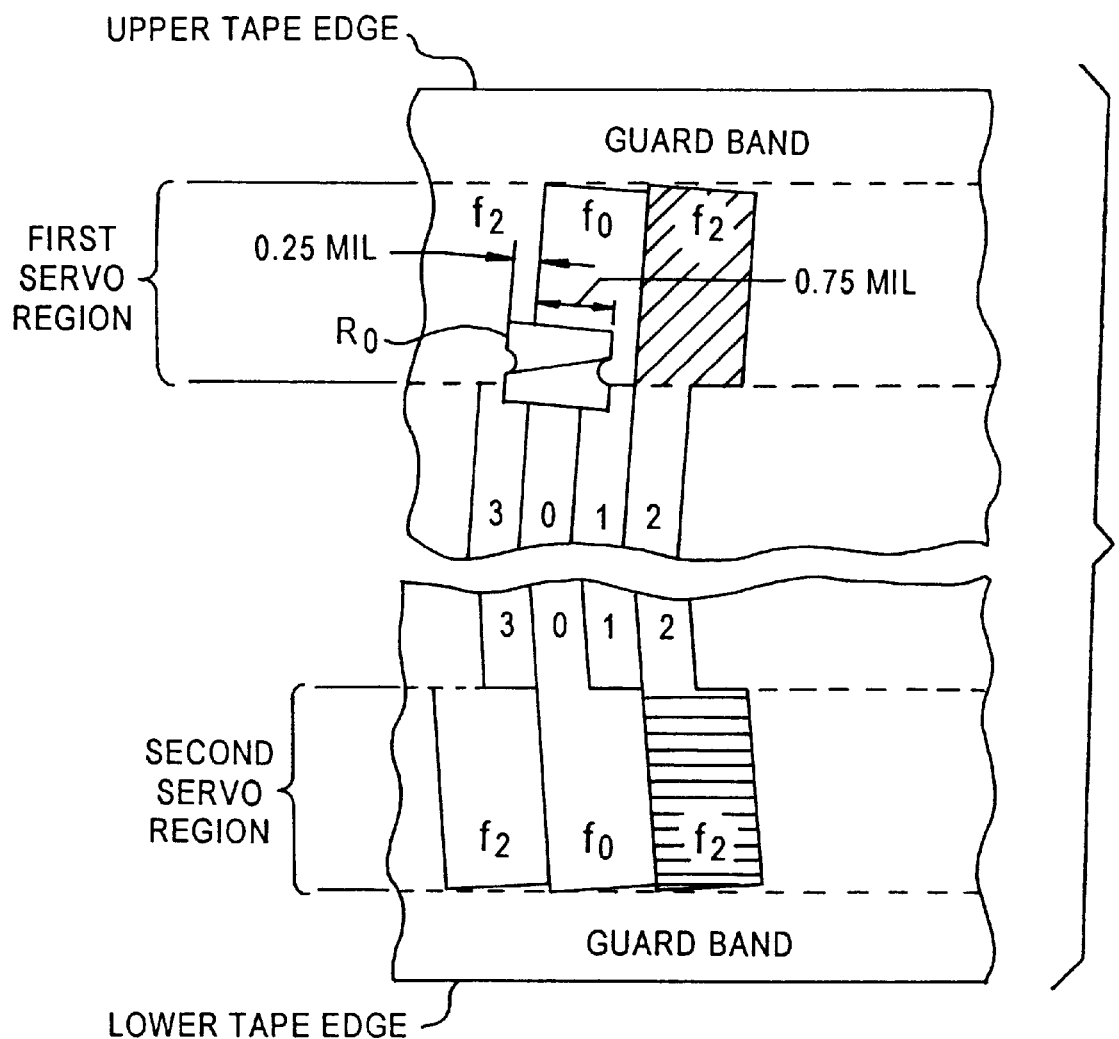
FIG. 9 depicts several tracks recorded by a prior art arcuate scanner.
Figure 10:
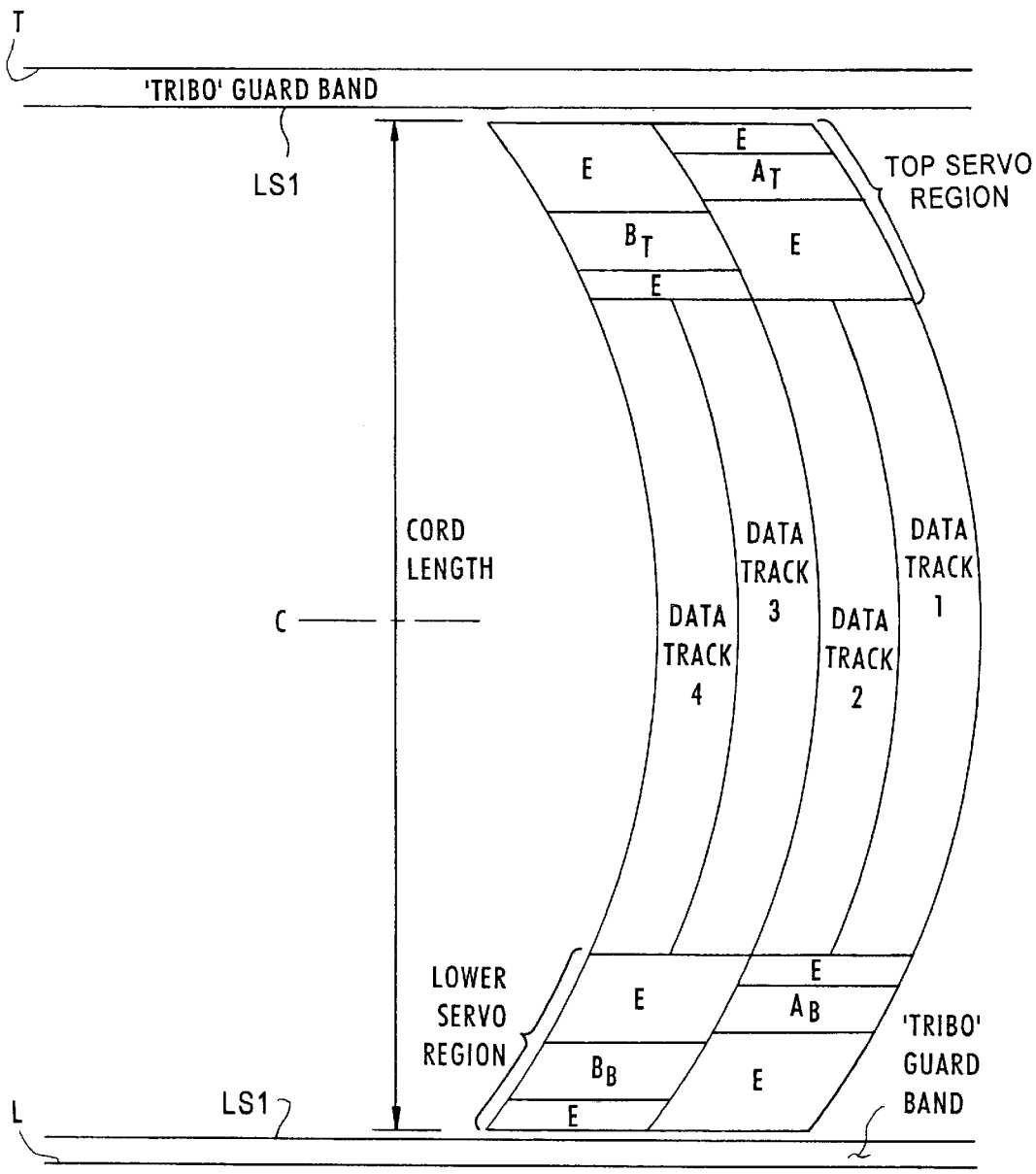
FIG. 10 is a diagram of an earlier format of information recorded on the tape, proposed by applicant.
Figure 11:
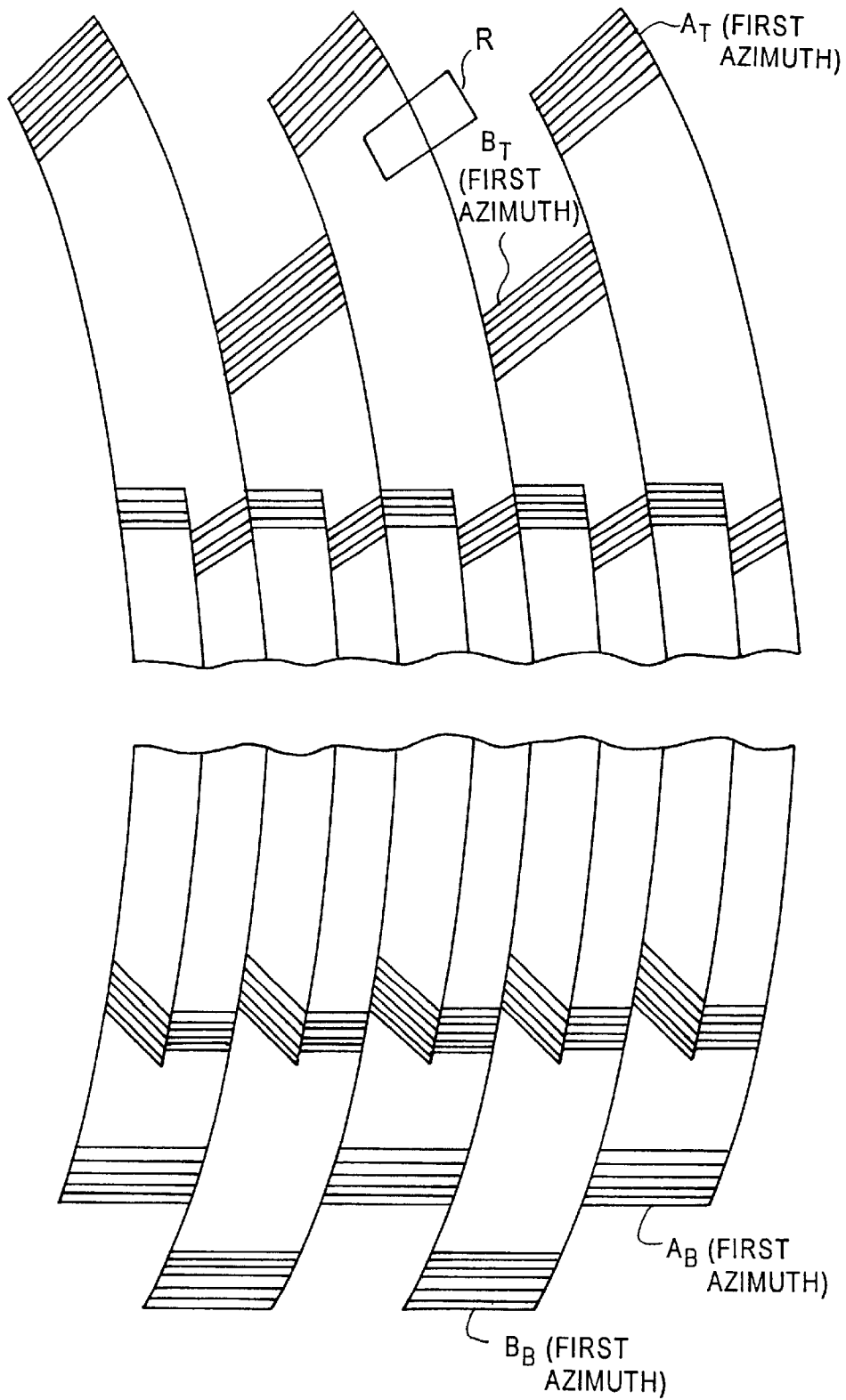
FIG. 11 illustrates an enlargement of several tracks recorded in the format of FIG. 10 and shows the azimuthal orientation of the recorded information.

For read head $R_1$ centered along a data track $D_1$ (FIG. 8), it is expected that the $A_B$ burst amplitude will be larger than the $B_b$ burst amplitude, therefore the B amplitude value is subtracted from the A amplitude value in circuit $54_1$. For read head $R_3$ centered along data track $D_3$, it is expected that the $A_B$ burst amplitude will be smaller than the $B_B$ burst amplitude, therefore the $A_B$ amplitude value is subtracted from the $B_B$ amplitude value in circuit $54_2$.

For read head $R_2$ centered along data track $D_2$ (FIG. 8), it is expected that the $A_T$ burst amplitude will be larger than the $B_T$ burst amplitude, therefore the $B_T$ amplitude value is subtracted from the $A_T$ amplitude value in circuit $55_1$. For read head $R_4$ centered along data track $D_4$, it is expected that the $A_T$ burst amplitude will be smaller than the $B_T$ burst amplitude, therefore the $A_T$ amplitude value is subtracted from the $B_T$ amplitude value in circuits $55_2$.

Thus, the first pair of relative value analysis circuits $54_1$ and $54_2$ calculate the amplitude relationship between the bottom servo bursts detected by read heads $R_1$ and $R_3$, respectively. The relative value analysis circuit $54_1$ subtracts the $B_B$ amplitude from the $A_B$ amplitude and divides the amplitude difference by the sum of those two amplitudes. The relative value analysis circuit $54_2$ subtracts the $A_B$ amplitude from the $B_B$ amplitude and divides the amplitude difference by the sum of those two amplitudes.

A multiplexer $56_B$ responds to a control signal from the microcontroller to select the output of the relative value analysis circuits $54_1$ and $54_2$ corresponding to the current read head. The multiplexer $56_B$ is a two-in to one-out selector. If read head $R_1$ is passing over the track, then the control signal instructs the multiplexer $56_B$ to select and output the signal from the relative value analysis circuit $54_1$ as the error signal $E_B$. If read head $R_3$ is passing over the track, then the control signal instructs the multiplexer $56_B$ to select and output the signal from the relative value analysis circuit $54_2$ as the error signal $E_B$.

The multiplexer $56_B$ supplies the error signal $E_B$ to the negative input of a summation circuit $57_B$. The positive input of the summation circuit $57_B$ is a reference signal. The summation circuit output is the position error signal (PES) for the tape speed control loop. For example, if an 80-20 ratio of A to B is expected, when tracking is correct, either of the circuits 54 will output a ratio signal of 0.6. The reference value would be 0.6, and the summation circuit therefore will output a 0.0 value PES signal indicating correct tracking. For a 70/30 ratio, as another example, the reference value would be 0.4.

The PES signal for tape speed control goes to the tape speed control circuit of FIG. 5. In that circuit, the capstan speed loop microcode loop 81 adjusts the capstan speed in response to that error signal to maintain tracking. For example, if the PES signal for tape speed is a negative value, the capstan speed loop microcode loop 81 causes the capstan drive to speed up until tracking alignment is detected and indicated by the PES signal for tape speed returning to 0.0. If the PES signal for tape speed is a positive value, the capstan speed loop microcode loop 81 causes the capstan drive to slow down until tracking alignment again is detected and indicated by the PES signal for tape speed returning to 0.0.

The second pair of relative value analysis circuits $55_1$ and $55_2$ calculate the amplitude relationship between the bottom servo bursts detected by the read heads $R_2$ and $R_4$, respectively. The relative value analysis circuit $55_1$ subtracts the $B_T$ amplitude from the $A_T$ amplitude and divides the amplitude difference by the sum of those two amplitudes. The relative value analysis circuit $55_2$ subtracts the $A_T$ amplitude from the $B_T$ amplitude and divides the amplitude difference by the sum of those two amplitudes.

A multiplexer $56_T$ responds to a control signal from the microcontroller to select the output of the relative value analysis circuits $55_1$ and $55_2$ corresponding to the current read head. The multiplexer $56_T$ is a two-in to one-out selector. If read head $R_2$ is passing over the track, then the control signal instructs the multiplexer $56_T$ to select and output the signal from the relative value analysis circuit $55_1$ as the error signal $E_T$. If read head $R_4$ is passing over the track, then the control signal instructs the multiplexer $56_T$ to select and output the signal from the relative value analysis circuit $55_2$ as the error signal $E_T$.

The multiplexer $56_T$ supplies the error signal $E_T$ to the negative input of a summation circuit $57_T$. The multiplexer $56_B$ supplies the error signal $E_B$ to the positive input of the summation circuit $57_T$. The difference between the top and bottom error signals ($E_B$-$E_T$) represents an error in the alignment of the ASHA axis with respect to the center of the information arc being read. The output of the summation circuit $57_T$ therefore is the position error signal (PES) for the tilt angle control loop. For example, if each of the respective read heads (e.g. $R_1$ and $R_2$) passes over the same proportional amounts of the A and B servo bursts at both the top and the bottom of a given track, then the error signal is 0.0 indicating correct position or angular alignment.

The PES signal for tilt angle control goes to the control circuit of FIG. 6. In that circuit, the LS1 tilt servo control (microcode loop) 71 adjusts the analog position error signal supplied to summation circuit 73. The output of that summation circuit 73 goes to the analog position loop 61 to thereby control the tilt motor 31 to maintain the proper pointing alignment of the ASHA axis with the center of the information arc being read.

In a second embodiment, the scanner system records servo bursts only in the lower servo region. The upper servo region is eliminated entirely, providing a still further increase in the amount of tape real estate available for recording user data. The write heads $W_1$ and $W_3$ write data followed by servo signals $A_B$ and $B_B$, and the read heads $R_1$ and $R_3$ read data and the servo signals $A_B$ and $B_B$. However, the write heads $W_2$ and $W_4$ only write data, and the read heads $R_1$ and $R_3$ read data only data.

In the second embodiment, servo control of the tape speed is based on the timed sampling of the bottom servo signals sensed by read heads $R_1$ and $R_3$, in essentially the same manner as in the earlier embodiment. However, the tilt angle control is based on an envelope detection of the data tracks. When the ASHA is properly centered, the envelope of the data track signal from the operative read head is relatively constant. By contrast, if the ASHA is not properly pointed, then the amplitude of the envelope will vary somewhat erratically. The size of the variations in the envelope signal are used to produce an error signal to modulate the tilt angle control system of FIG. 6.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of reading data on a recording medium, comprising the steps of:

rotating an arcuate scanner head assembly about an assembly axis, said arcuate scanner head assembly comprising a plurality of read heads radially mounted on the assembly;

moving the recording medium longitudinally and across the assembly axis;

activating the read heads to read data tracks recorded on the recording medium; and activating each of the read heads at respective identified locations to read servo signals recorded in at least one servo region of the recording medium, wherein the activation at the respective identified locations causes each of the read heads to always read servo signals having a respective azimuth substantially parallel to the longitudinal axis of the medium.

2. A method as in claim 1, wherein first and second ones of the predetermined read heads are oriented to read at one common azimuth which is substantially parallel to the longitudinal axis of the medium in one servo region extending longitudinally at a predetermined lateral position on the medium.

3. A method as in claim 2, wherein the one servo region extends longitudinally at a predetermined lateral distance from one edge of the medium.

4. A method as in claim 1, wherein:

a first predetermined read head is oriented to read at a first azimuth which is substantially parallel to the longitudinal axis of the medium in a first servo region near a first edge of the medium; and a second predetermined read head is oriented to read at a second azimuth which is substantially parallel to the longitudinal axis of the medium in a second servo region near a second edge of the medium.

5. A method as in claim 1, wherein the moving recording medium comprises a longitudinally moving magnetic tape.

6. A method as in claim 1, wherein the activation of one of the predetermined read heads to read servo signals comprises:

during a first predetermined time window, taking a first sample amplitude of servo burst signal from the one predetermined read head representing a servo burst signal recorded along a predetermined track;

during a second predetermined time window, taking a second sample amplitude of servo burst signal from the one predetermined read head representing a servo burst signal recorded along a track adjacent to the predetermined track; and controlling a parameter of operation of the method of reading data in response to a relationship of the first sample amplitude to the second sample amplitude.

7. A method as in claim 6, wherein the medium comprises a recording tape.

8. A method as in claim 6, wherein the step of controlling comprises adjusting the speed of the moving recording medium relative to the arcuate scanner head assembly in response to the relationship of the first sample amplitude to the second sample amplitude.

9. A method as in claim 6, wherein the step of controlling comprises adjusting a positional alignment of an arcuate scanner head assembly relative to the moving recording medium.

10. A method as in claim 9, wherein the step of adjusting a positional alignment of the arcuate scanner head assembly comprises adjusting a tilt angle of the arcuate scanner head assembly.

11. A method as in claim 6, wherein the first predetermined time window precedes the second predetermined time window.

12. A method as in claim 6, wherein the second predetermined time window precedes the first predetermined time window.

13. A method as in claim 6, wherein the first and second, predetermined time windows precede a time window during which the first read head is expected to pass over a data region of the predetermined track.

14. A method as in claim 6, wherein the first and second predetermined time windows follow a time window during which the first read head is expected to pass over a data region of the predetermined track.

15. A method as in claim 6, wherein:

the step of taking a first sample amplitude comprises sampling signals from the one predetermined read head within one predetermined passband frequency range; and the step of taking a second sample amplitude comprises sampling signals from the one predetermined read head within said one predetermined passband frequency range.

16. A method as in claim 6, wherein the activation of the predetermined read heads to read servo signals further comprises:

during a third predetermined time window, taking a third sample amplitude of servo burst signal from a second predetermined read head representing a servo burst signal recorded along another predetermined track;

during a fourth predetermined time window, taking a fourth sample amplitude of servo burst signal from the second predetermined read head representing a servo burst signal recorded along a track adjacent to said another predetermined track; and controlling a parameter of operation of the method of reading data in response to a relationship of the third sample amplitude to the fourth sample amplitude.

17. An accurate scanning system, comprising:

an arcuate scanner having a plurality of scanner heads operating at at least two different azimuths, the arcuate scanner reading and writing data along arcuate tracks on a recording tape across a longitudinal axis of the recording tape, and the arcuate scanner reading and writing servo signals through the scanner heads at predetermined locations in relation to said arcuate tracks such that all of said servo signals on the recording tape have an azimuth substantially parallel to the longitudinal axis of said recording tape;

a circuit responsive to read signals from one of the heads for detecting signals of a predetermined frequency;

a circuit for sampling amplitude of the detected signals of a predetermined frequency during predetermined time windows to produce sample amplitudes;

a circuit responsive to the sample amplitudes for generating a position error signal; and a control circuit for controlling at least one operational parameter of the accurate scanning system in response to the position error signal.

18. A system as in claim 17, wherein:

the circuit for sampling (1) samples amplitude of the detected signals of a predetermined frequency during a first predetermined time window to produce a first sample amplitude and (2) samples amplitude of the detected signals of a predetermined frequency during a second predetermined time window to produce a second sample amplitude; and the circuit responsive to the at least one sample amplitude generates the position error signal as a function of a relationship between the first and second sample amplitudes.

19. A system as in claim 17, wherein the control circuit comprises:

a position alignment system coupled to the arcuate scanner to selectively align the arcuate scanner with regard to the recording tape; and a circuit controlling the position alignment system in response to the position error signal.

20. A system as in claim 19, wherein the position alignment system comprises a tilt motor coupled to the arcuate scanner for selectively tilting the arcuate scanner at an angle with regard to the recording tape.

21. An apparatus comprising:

an arcuate scanner comprising two read heads configured to read signals from a magnetic medium having a longitudinal axis as the read heads scan the medium across the longitudinal axis, each read head reading at one of two different azimuths; and means for controlling read operations of the two heads such that each of the heads always reads servo signals having an azimuth substantially parallel to the longitudinal axis of the medium and for controlling an operational parameter of the apparatus in response to reading of the servo signals.

* * * * *